United States Patent [19]

Cho

[11] Patent Number: 5,512,791
[45] Date of Patent: Apr. 30, 1996

[54] AIR GAP ADJUSTING APPARATUS FOR CYLINDRICAL LINEAR MOTOR OF AN ELEVATOR

[75] Inventor: Kil Hee Cho, Kyungsangnam, Rep. of Korea

[73] Assignee: LG Industrial Systems Co., Ltd., Seoul, Rep. of Korea

[21] Appl. No.: 254,702

[22] Filed: Jun. 6, 1994

[30]     Foreign Application Priority Data

Jun. 11, 1993 [KR] Rep. of Korea .................. 10269/1993
Nov. 5, 1993 [KR] Rep. of Korea .................. 23118/1993

[51] Int. Cl.$^6$ .................................................. H02K 41/00
[52] U.S. Cl. .............................................. 310/12; 187/250
[58] Field of Search ................................... 187/410, 250; 310/12, 13, 14

[56]                References Cited

U.S. PATENT DOCUMENTS 5,005,672  4/1991  Nakai et al. ................. 187/17

Primary Examiner—Steven L. Stephan
Assistant Examiner—Judson H. Jones
Attorney, Agent, or Firm—Oliff & Berridge

[57]                ABSTRACT

An air gap adjusting apparatus for a cylindrical linear motor of an elevator includes a cylindrical upper plate having an internally threaded portion at an inner edge thereof and fixedly mounted on the upper portion of the rotor, a plurality of adjusting units pivotably mounted on the plate member, for adjusting an air gap between an inner surface of the rotor and the outer surface of the stator, and an inverted cone-shaped hollow tapered guide member having a threaded lower portion engaging the plate member and displacing the plurality of adjusting units for thereby adjusting an air gap between an inner surface of the rotor and the outer surface of the stator.

6 Claims, 4 Drawing Sheets

AIR GAP ADJUSTING APPARATUS FOR CYLINDRICAL LINEAR MOTOR OF AN ELEVATOR

BACKGROUND OF THE INVENTION

1. Field of the Invention

The present invention relates to an air gap adjusting apparatus for a cylindrical linear motor of an elevator.

2. Description of the Conventional Art

Conventionally, the cylindrical linear motor includes a cylindrical rotor having a longitudinal bore of a predetermined diameter therethrough and a longitudinal stator slidably engaged within the longitudinal bore hole of the rotor. The rotor moves along the stator by means of a magnetic force generated between the inner surface of the rotor and the outer surface of the stator with a predetermined gap therebetween.

Referring to FIG. 1, there is shown a cylindrical linear motor-driven elevator including a rectilinear hexahedron frame formed of a plurality of reinforced steel bars connected together at the ends thereof. A stator 38 made of electrically conducting materials is disposed in parallel between the rear-most two vertical bars A and B with one end of the stator 38 being attached to a central position of the upper rear bar C and the other end of the stator 38 being connected to a fixing unit 42 connected to a central position of the lower rear bar D.

A front supporting shaft 10 carrying a plurality of pulleys 12 rotatably engaged thereon is provided, with its one end being connected to a front end of the upper left bar E and its other end being connected to a front end(not shown) of the upper right bar F. A rear supporting shaft 10a having a plurality of pulleys 12a rotatably carried thereon is provided, with its one end being connected to a rear end of the upper left bar F and its other end connected to a rear end of the upper right bar E. Mounted to each front vertical bars G and H is provided a front guide rail 20 extending therealong from their upper end to lower end. Also, there is mounted a rear guide rail 32 on each of the rear two bars A and B. A substantially rectilinear hexahedral box-shaped cage 16 is suspended by a plurality of metal cables 14, via four pulleys 12 and 12a, with its one of the ends being connected to an upper surface of the cage 16 and with the other ends being connected to the upper portion of a rectilinear hexahedron frame 24. On the left and fight outer surfaces of the cage 16 am provided a plurality of rollers 22 which enable a slidable movement of the cage along the front guide rails 20. The frame 24 whose upper bar is connected with an end of the ropes 14 slidably moves along the rear guide rails 32. The frame 24 has a hole formed through the central positions of both an upper bar and lower bar thereof, for enabling the stator 38 to pass through the frame 24 and the rotor 28 which is vertically affixed at a central position of the frame 24, thereby permitting the rotor 28 to move slidably along the stator 38. The rotor 28 receives the stator 38 via the bore hole thereof. At a bottom end of the rotor 28, a control unit 30 is mounted just under the frame 24. And, a plurality of counter weights 26 made of heavy-weight materials are provided in the left and right inside portions of the frame 24 for facilitating the cylindrical linear motor to operate with less drive force when the cage 16 moves upwardly.

Referring to FIG. 2, there is shown a conventional air gap adjusting apparatus for a cylindrical linear motor of an elevator. FIG. 3 shows a cross-sectional view taken along line III—III of FIG. 2. The conventional air gap adjusting apparatus includes a plurality of adjusting units 50 mounted at an outside upper portion of the rotor 28. The rotor has a longitudinal bore hole extending centrally therethrough. Stator 38 is slidably inserted within the bore hole of the rotor 28. Each adjusting unit 50 includes a roller 46 having a rotatable supporting pin 48 fixedly affixed to each side of the roller 46. A spring 52 is connected between the end of each supporting pin 48 and a rear inner surface of the adjusting unit 50. In both side surfaces of the adjusting unit 50 is provided an elongated slot 50a having a predetermined diameter and length for receiving the supporting pins 48 therein.

The operation of the conventional air gap adjusting apparatus for a cylindrical linear motor of an elevators is described below.

When electric power is supplied to the rotor 28 and the stator 38, an electromagnetic force is generated with its force and direction depending upon the supplied electric power. As a result of this electromagnetic force the rotor 28 moves linearly along the stator 38. At this time, there is always maintained an air gap between the inner surface of the rotor 28 and the outer surface of the stator 38 for enabling the rotor 28 to move smoothly therealong. During operation of the elevator there may occur some vibrations or an unbalanced load in the cage because passengers in the cage are positioned randomly. Therefore, these vibrations and unbalanced loads are transferred to the rotor 28 via the metal cables 14, shown in FIG. 1, so that there can occur some vibration between the inner surface of the rotor 28 and the outer surface of the stator 38 and the unbalanced loading therebetween. To compensate for vibrations and unbalanced load therebetween, the adjusting units 50 are provided. When the adjusting unit 50 receives those vibrations and unbalanced load, the roller 46 which is made as an elastic member absorbs the impact with its elastic properties and moves backwardly along the elongated slot 48. The spring 48 further counteracts the impacts therefrom. Therefore, the air gap between the inner surface of the rotor 28 and the outer surface of the stator 38 is always maintained at a predetermined distance therebetween.

However, when only one or more roller become worn out due to the unbalanced load in the cage there have been no measures available to adjust each of the rollers because the size of the rollers and the springs are previously determined by the manufacturer, so that it cannot be adjusted correctly, respectively.

Referring to FIG. 4, there is shown an air gap variation detecting apparatus for detecting a malfunction in the air gap maintained between the outer surface of the rotor 28 and the inner surface of the stator 38. It includes a cuff-shaped casing 58 surrounding the stator while not being in contact with an outer surface of the stator 38, a fixing screw 59 provided at a lower portion of the casing 58, a contact sensor 57 whose one end is electrically connected to one end of the fixing screw 59 and whose other end is positioned by means of a tightening screw 55 so that it is not electrically in contact with the outer surface of the stator 38 when a proper air gap is maintained. The other end of the fixing screw 59 is connected with a terminal 53 of DC(Direct Current) 52. A DC terminal 52 is also connected to internally the stator 38.

The operation of the conventional air gap variation detecting apparatus is as follows. When there is a malfunction in maintaining a gap distance between the outer surface of the rotor 28 and the inner surface of the stator 38, the contact sensor 57 comes into electrical contact with the outer surface of the stator 38, so that there a warning lamp(not shown) is lighted, and thus the elevator stops. In addition, there can be a slight volume expansion between the outer surface of the rotor 28 and the inner surface of the stator 38 due to heat generated by the continuous operation of the elevator. As a result of the expansion between the inner surface of the rotor 28 and an outer surface of the stator 38 there may often occur contact between the contact sensor 57 and the outer surface of the stator 38 thus causing frequent malfunctioning of the elevator.

SUMMARY OF THE INVENTION

Accordingly, it is an object of the present invention to provide an air gap adjusting apparatus for a cylindrical linear motor of an elevator capable of adjusting the air gap between an outer surface of the rotor and an inner surface of the stator.

It is a further object of the present invention to provide an air gap adjusting apparatus for a cylindrical linear motor of an elevator with a micro-switch.

To achieve the objects, the air gap adjusting apparatus of the present invention includes a cylindrical upper plate member each having an internally threaded portion at an inner edge thereof fixedly mounted on an upper portion of the rotor, a plurality of adjusting units, pivotably mounted atop the plate member, for adjusting an air gap between an inner surface of the rotor and the outer surface of the stator, and an inverted frusco-conical-shaped hollow tapered guide member having an externally threaded lower portion by which it may be screwed into the internal thread of the plate member for adjusting the plurality of adjusting units.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENTS

Figure 5:
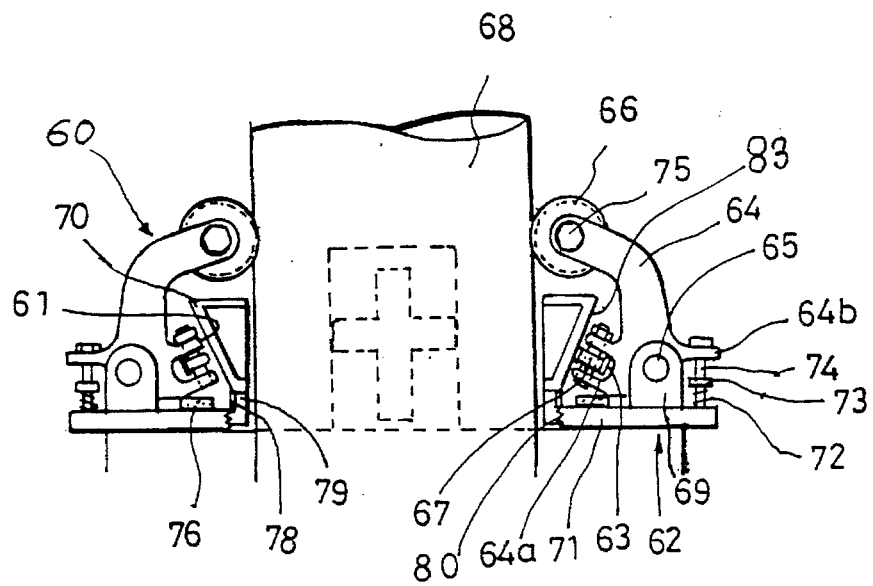
FIG. 5 is an elevation view showing an air gap adjusting apparatus according to a first embodiment of the present invention.
Figure 6:
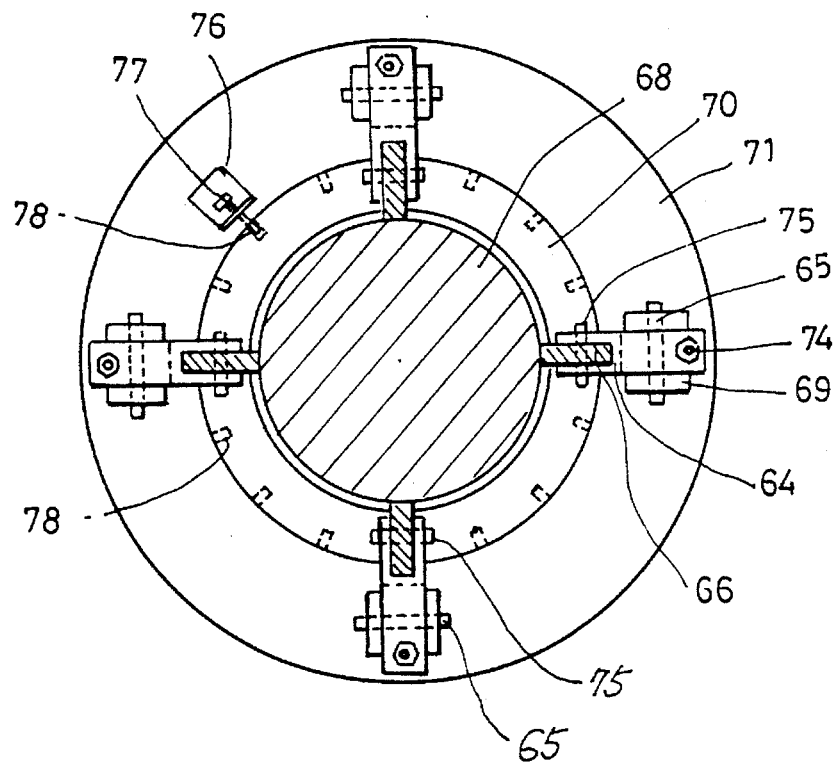
FIG. 6 is a top view showing the air gap adjusting apparatus according to the first embodiment of the present invention.

Referring to FIGS. 5 and 6, the air gap adjusting apparatus for a cylindrical linear motor of an elevator according to the present invention is applied to a cylindrical rotor 62 of the linear motor having a longitudinal bore centrally provided therethrough for receiving a stator 68 being slidable within the bore hole of the rotor 58. According to the invention, a plurality of air gap adjusting units 60 are mounted on the top of the rotor 58.

The plurality of adjusting units 60 each include an inwardly-curved arm member 64 pivotably mounted to cylindrical upper plate 71 which is fixed on the top end portion of the rotor 62. For pivotably supporting the arms 64 of the adjusting units 60 spaced pairs of supporting brackets 69 are fixedly mounted at intervals on the upper plate 71, each bracket 69 having a semicircularly-shaped upper portion receiving a pivot shaft 65 on which is carried the lower end of the arm member 64. At the inwardly curved upper end of each arm member 64 a forked portion is formed in which is rotatably mounted a first roller 66 whose peripheral edge portion is in rolling contact with the outer surface of the stator 68 mounted in the forked ends of the arm member 64.

The lower end of each arm member 64 is formed below the pivot thereof with an inwardly-extending should portion from which obliquely extend upwardly and inwardly a pair of spaced-apart second bracket 64a. In the space between the brackets 64a is provided a second roller 63 rotatably carried by a shaft 67 having its respective ends mounted in the second brackets 64a, such that outer peripheral edge of the roller 63 projects obliquely inwardly and upwardly toward the stator 68. The lower end of each arm member 64 is further formed above the pivot thereof with an outwardly projecting third bracket 64b opposite the inwardly projecting second bracket 64a. An adjusting screw 74 is threaded through the third bracket 64b, so that screw 74 extends downwardly towards plate 71. A compression spring 72 is fitted over the lower end of screw 74 and is compressed against the plate 71 by means of a cap 73 threaded onto an intermediate portion of screw 74, by which the compression force of the spring 72 may be set. A resilient pad 76 is affixed to the plate 71 proximately under the shoulder portion of the arm member 64, thereby to cushion the inward excursion of the arm member 64.

The inner peripheral edge of the plate 71 is formed with an internal thread. A ring-shaped collar 79 is formed at its lower portion with an external thread 80 mating with the internal thread of the plate 71, whereby the collar 79 is threaded onto the plate 71 in the gap between the inner edge of plate 71 and the periphery of stator 68.

An inverted frusco-conical-shaped hollow tapered guiding member 70 is mounted atop the collar 79, the guiding member surrounding the stator 68 with a predetermined distance maintained between the outer surface of the stator 68 and an inner surface of the guiding member 70. A plurality of L-shaped brackets 76 are mounted at intervals to the top of plate 71, each bracket carrying radially inwardly extending fixing bolt 77. In the outer surface of collar 798 are formed a plurality of radial holes 78 for each receiving a corresponding fixing bolt 77 therein. A plurality of fixing bolts 77 are engaged for fixing the plate 71 to the collar 79.

The outer face 83 of guide member 70 tapers obliquely downwardly and inwardly, so as to present a wedge section which, as the collar 79 is screwed down, further into the plate 71, brings to outer face 53 of guide member 70 into increasingly wider contact with the second rollers 63 carried by the arm member 64. The pressing face of the outer face 83 of guide member 70 against the second rollers 63 causes the arm members 64 to pivot inwardly on pivots 65, so that first rollers 66 carried by the arm members 64 are pressed against stator 68 with increasing force as the collar 79 carrying guide member 70 is screwed down farther into plate 71.

With the reference to the above-described elements of the air gap adjusting apparatus 60 for a cylindrical linear motor of elevators according to the present invention, the operation thereof will now be described.

Figure 1:
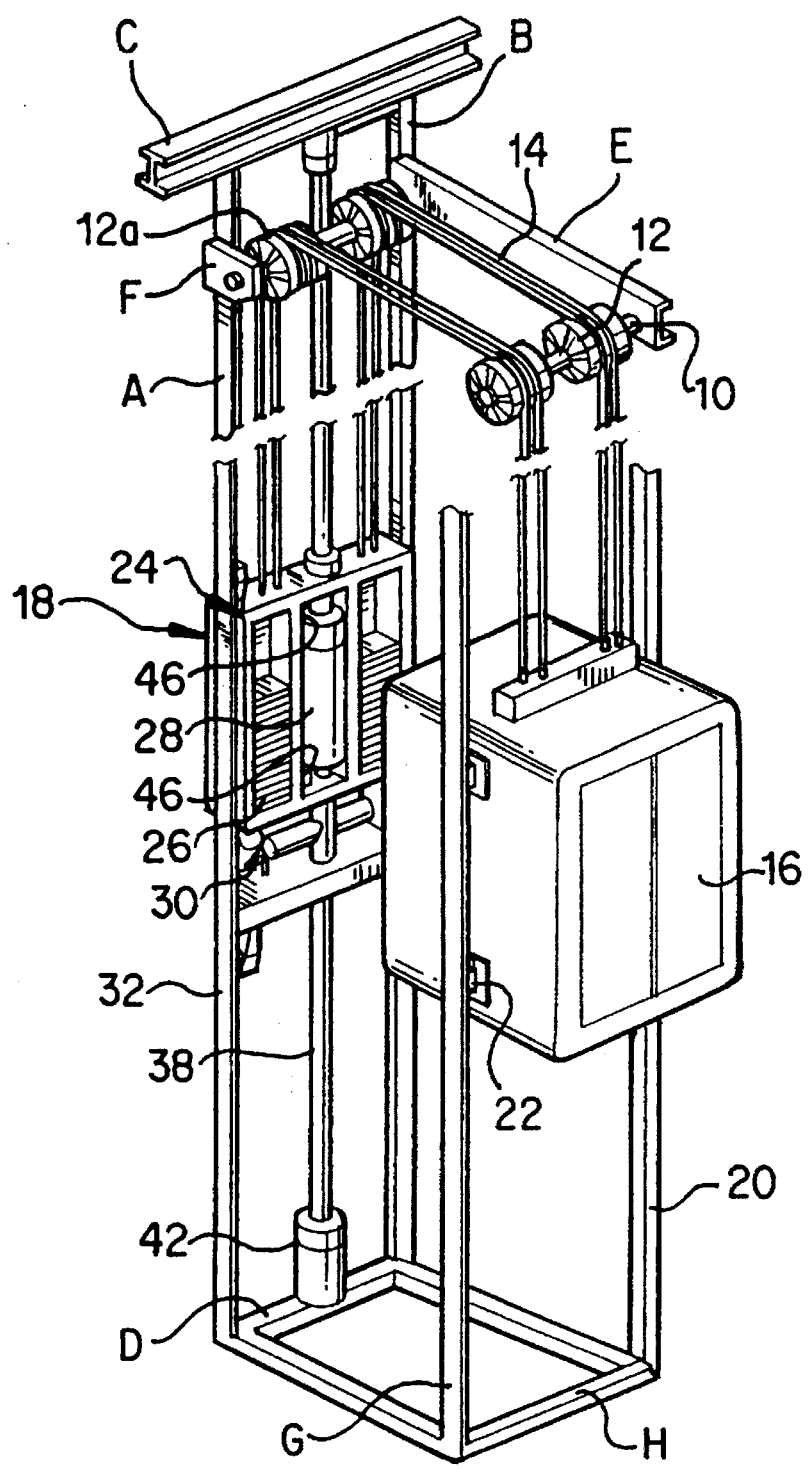
FIG. 1 is a schematic perspective view showing a conventional elevator with a cylindrical linear motor.
Figure 2:
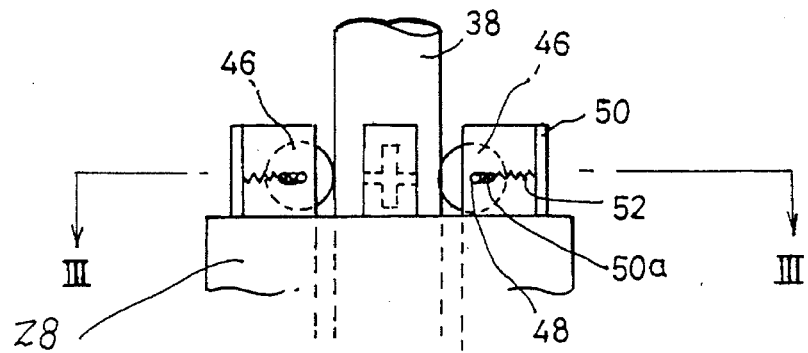
FIG. 2 is an elevation view showing a conventional air gap adjusting apparatus for a cylindrical linear motor of an elevator.
Figure 3:
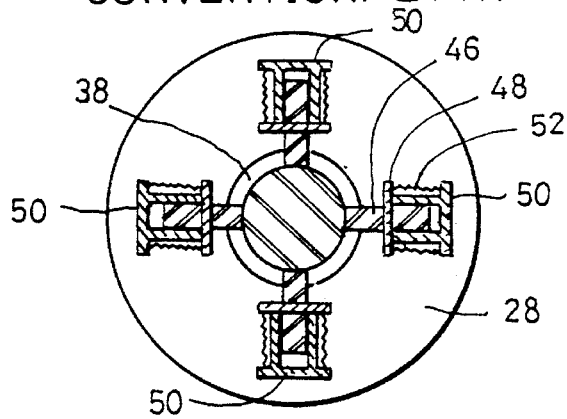
FIG. 3 is a cross-sectional view taken along a line III—III in FIG. 2.
Figure 4:
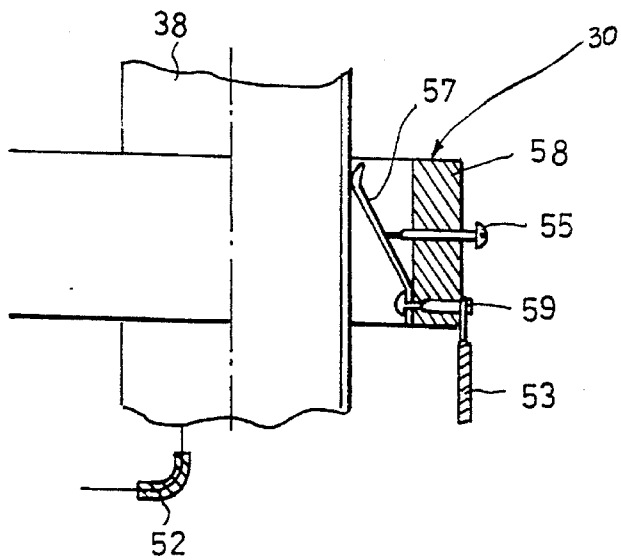
FIG. 4 is a partial cross-sectional view showing a conventional air gap detecting sensor.

As described previously, when electric power is supplied to the rotor 62 and the stator 68, an electromagnetic force is generated therebetween. As a result the rotor 62 moves along the stator 68. At this time, there is maintained an air gap between the inner surface of the rotor 62 and the outer surface of the stator 68 for enabling the rotor 62 to move smoothly along the stator 68. During operation of the elevator there always occurs some vibrations or an unbalanced load in the cage because the people in the cage are positioned randomly. Therefore, these vibrations and unbalanced loads are transferred to the rotor 62 via the metal cables 14, shown in FIG. 1, so that there occurs some vibrations between the inner surface of the rotor 62 and the outer surface of the stator 68 and the unbalanced load therebetween. For concurrently adjusting all gaps of the adjusting units 64, it is necessary to tighten or loosen the collar 79 carrying the guide member 70 relative the plate member 71. The description of the operation of the adjusting units 64 is as follows.

If needed, a predetermined gap between the inner surface of the rotor 62 and the outer surface of the rotor 68 may be established for adjusting an unbalanced loading therebetween due to the one-sided weight distribution in the cage of the elevator. After loosening the fixing bolts 77, the collar 79 mounting the tapered guide member 70 is screwed down into plate 71, so that the outer surface 83 of the guide member 70 having the downwardly inclined surface contacts a circumferential surface of the second rollers 63, and thus the inclined surface press upon the second rollers 63. The upper ends of arm members are pivoted inwardly to cause the first rollers 66 to press against stators 68 and the gap between the outer surface of the stator 68 and the inner surface of the rotor 62 becomes widened. Then the fixing bolts 77 are tightened to fix the collar 79 and guide member 70 in place.

In case that only one roller is worn out due to the one-sided weight distribution in the cage of the elevator, it is also needed to adjust the corresponding gap between the outer surface of the stator 68 and the inner surface of the rotor 62 by tightening the adjusting screw 74 and thus the upper ends of adjusting arms 64 are opened outwardly and the gap between the outer surface of the stator 68 and the circumferential surface of the first rollers 66 becomes widened.

Figure 7:
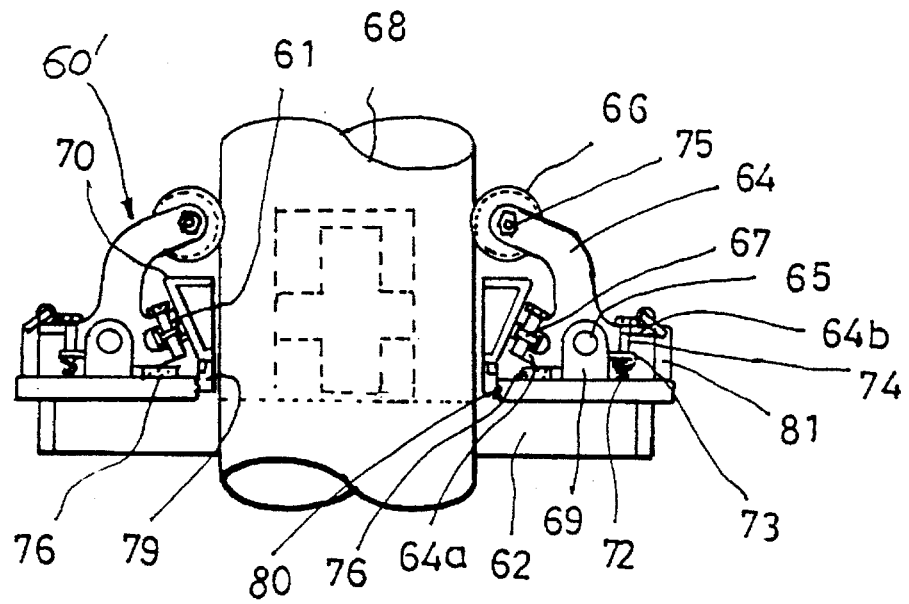
FIG. 7 is an elevation view showing an air gap adjusting apparatus according to an other embodiment of the present invention.
Figure 8:
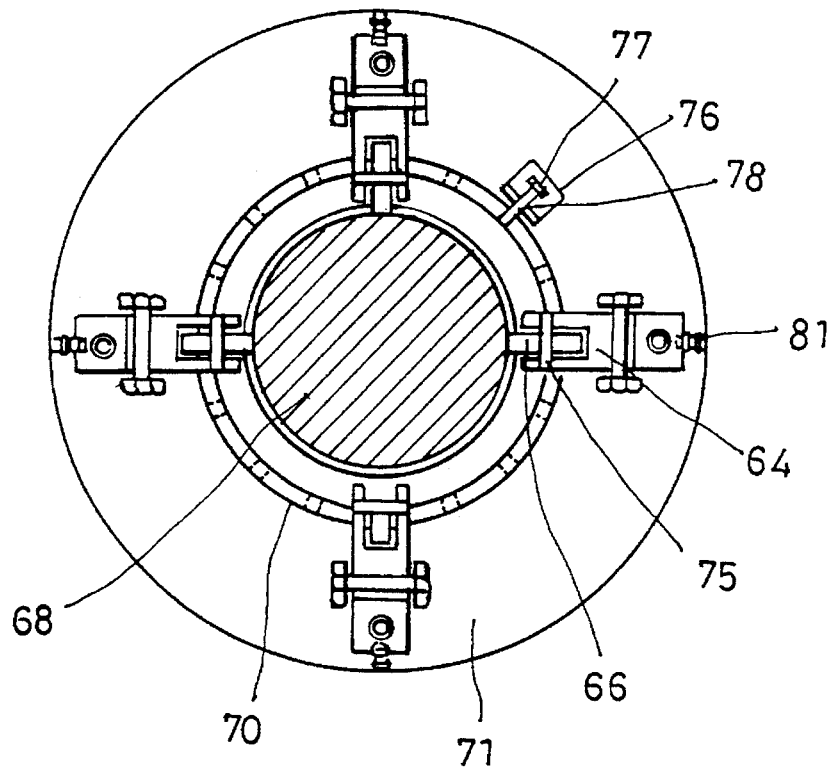
FIG. 8 is a top view showing the air gap adjusting apparatus according to the second embodiment of the present invention.

FIGS. 7 and 8 show a second embodiment of the present invention, in which the adjusting unit 60 includes the provision of micro-switches 81 mounted on the plate 71 with their actuator movable by the third brackets 64b and located just behind the adjusting screws 74 for detecting a displacement of any of the adjusting arm 64. If there is detected a predetermined displacement of an adjusting arm 64, the elevator stops upon the signals output from the microswitches 81. Therefore the second embodiment according to the present invention can be performed an enhanced function over that of the first embodiment in adjusting the air gap between the inner surface of the rotor 62 and the outer surface of the stator 68.

In addition, by adapting the taper guide member 70, operations is enhanced by a cooling effect for preventing the over-heating in the air gap between the outer surface of the rotor 62 and the inner surface of the stator 68.

In comparison with the air gap detecting sensor 57 of the conventional art, the present invention provides detection of a malfunction of the gap between the inner surface of the rotor 62 and the outer surface of the stator 68 so that it prevents the abrupt stoppage during operation of the elevator, and thus the safe and convenient operation can be obtained.

What is claimed is:

1. An air gap adjusting apparatus for a cylindrical linear motor of an elevator having a cylindrical rotor having a longitudinal bore hole therethrough and a stator slidable within the bore hole, with a predetermined air gap between an inner surface of the rotor and an outer surface of the stator, comprising:

a cylindrical upper plate member each having an internally threaded portion at an inner edge thereof fixedly mounted on an upper portion of the rotor;

a plurality of adjusting units, pivotably mounted atop the plate member, for adjusting an air gap between an inner surface of the rotor and the outer surface of the stator; and an inverted frusco-conical-shaped hollow tapered guide member having an externally threaded lower portion by which it may be screwed into the internal thread of the plate member for adjusting the plurality of adjusting units.

2. The air gap adjusting apparatus of claim 1, wherein said adjusting units each include an arm member at an upper end of which is carried held a first roller whose outer circumferential surface is in contact with an outer surface of the stator, lower end of each arm member carrying an inwardly facing rotatable second roller whose outer circumferential surface is in contact with an inclined outer surface of the guide member, for enabling the adjusting unit to be opened and closed as the taper guide member is tightened or loosened in the taper member, and the lower end of each arm member being further provided with an outwardly extending bracket carrying and adjusting screw for adjusting the displacement of each individual adjusting unit.

3. The air gap adjusting apparatus of claim 1, wherein the guide member may be fixed in position relative the adjusting units by a plurality of fixing bolts carried on the plate member for engaging a corresponding plurality of fixing holes provided in the guide member.

4. The air gap adjusting apparatus of claim 1, wherein said adjusting unit further includes an air gap detecting means.

5. The air gap adjusting apparatus of claim 4, wherein said air gap detecting means is a micro-switch, mounted behind the bracket of the arm member, for detecting a displacement of the adjusting unit.

6. The air gap adjusting apparatus of claim 4, wherein said air gap detecting means is operable to stop an operation of an elevator in accordance with detection of a predetermined signal therefrom.

* * * * *